June 17, 1941.  P. R. FAIRBANKS  2,246,128
CONTROL FOR DUMP TRUCK TAIL GATES
Filed April 11, 1940  3 Sheets-Sheet 1
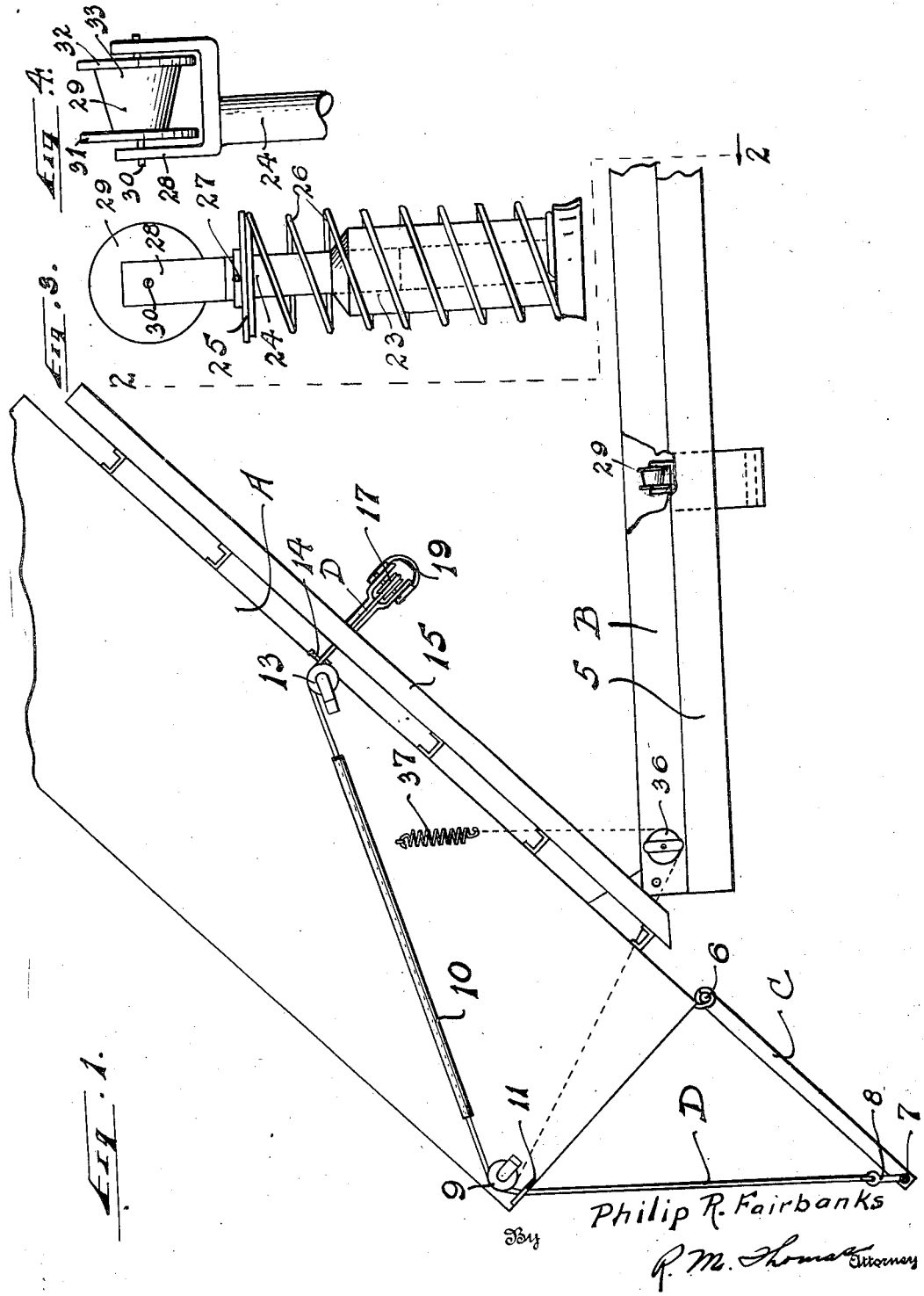
Philip R. Fairbanks

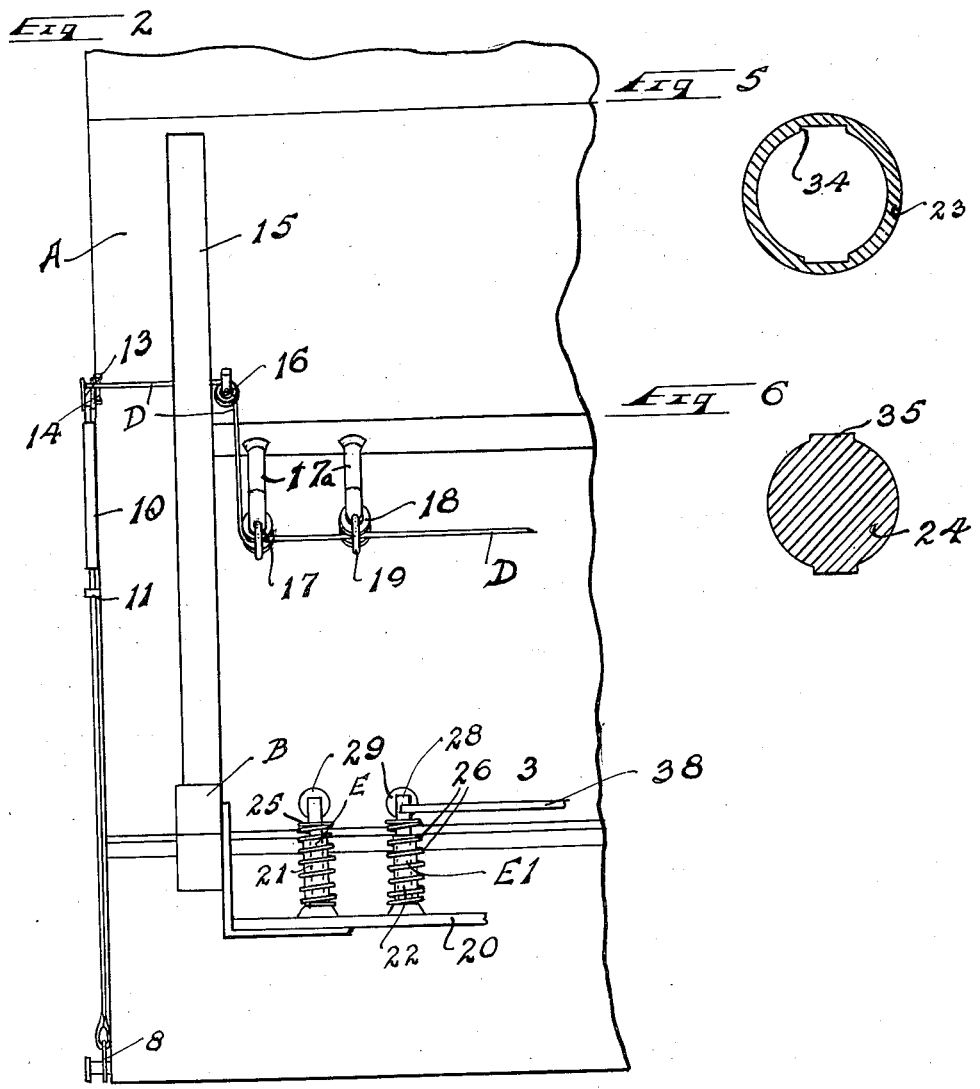

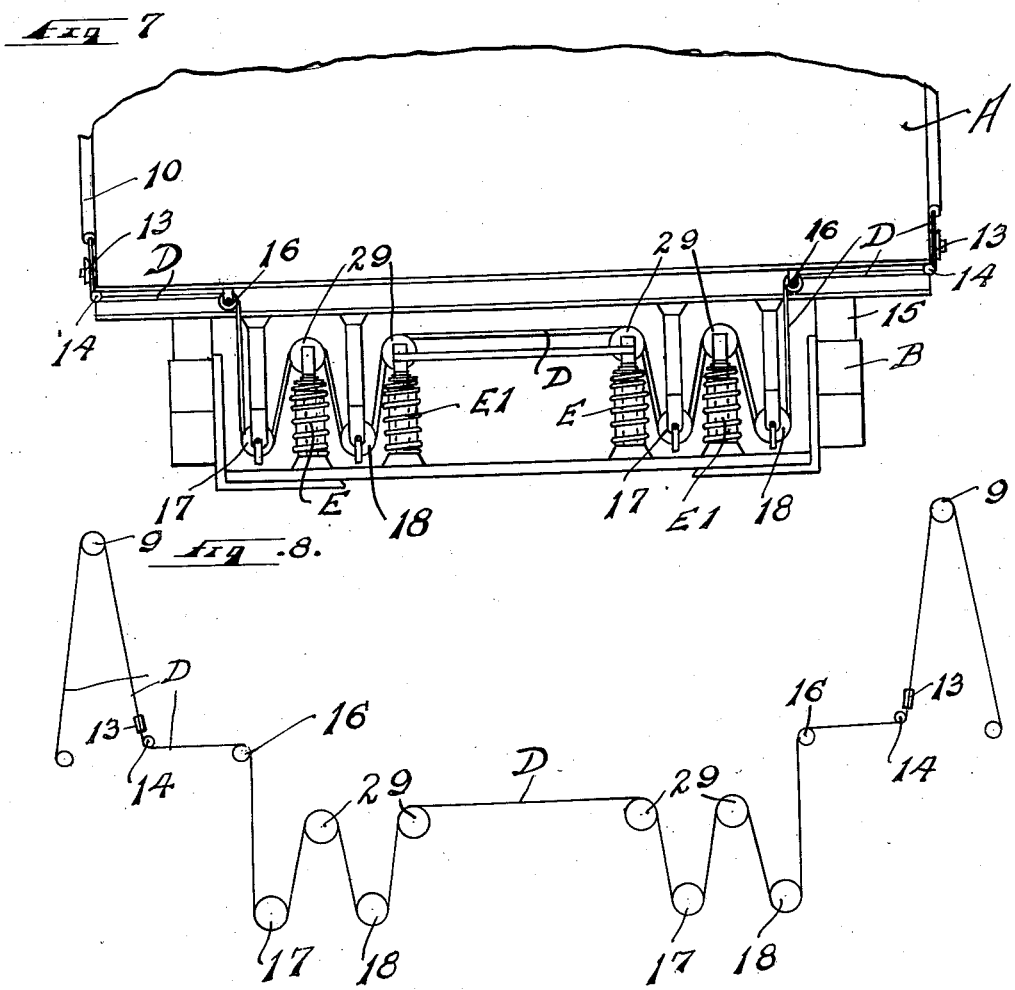

Patented June 17, 1941

2,246,128

UNITED STATES PATENT OFFICE 2,246,128

CONTROL FOR DUMP TRUCK TAIL GATES

Philip R. Fairbanks, Ogden, Utah, assignor of one-half to Ora Bundy, Ogden, Utah Application April 11, 1940, Serial No. 329,186

4 Claims. (Cl. 298—23)

My invention relates to dump trucks or like vehicles, and has for its object to provide a new and highly efficient control for the tail gate, which is operated by the movements of the dump body.

A further object is to provide a dump body tail gate control in which cables and yielding springs control the closing of the gate and simultaneously permit yieldability of the gate when closed so that should the tail gate be struck by the loading shovel or any other obstacle the gate will yield sufficiently to pass without breaking the gate and which also yields should any obstruction be in the way of the gate closing as the body is lowered to horizontal.

A still further object is to provide a gate for trucks which is yieldably supported in the closed position but which is automatically opened when the dump body is elevated for dumping the materials from the body and which control mechanism may be readily disconnected and hooked out of the way when it is desired to use the dump body with the tail gate pivoted at the top side swinging free from the bottom for certain types of unloading jobs.

These objects I accomplish with the device illustrated in the accompanying drawings in which similar numerals and letters of reference indicate like parts throughout the several views and as described in the specification forming a part of this application and pointed out in the appended claims.

In the drawings—

Figure 1 is a side elevation of the rear end of a dump truck body shown elevated as for unloading.

Figure 2 is a view taken on line 2—2 of Figure 1, parts cut away.

Figure 3 is an enlarged view of telescoping stand which is mounted to the lower horizontal bed frame.

Figure 4 is a side view of the sheave and mounting thereof used in the telescoping stand.

Figure 5 is a section of the stand.

Figure 6 is a section of the sheave support shaft which telescopes into the stand.

Figure 7 is a view of the truck body lowered to the horizontal position with the tail gate control shown in the shortened position.

Figure 8 is a diagrammatic view of the cable and sheaves therefor in the shortened position.

In the drawings I have shown the dump body as A, pivotally mounted to the bed frame B which bed frame is secured to the stringers 5 of the dump truck in the usual manner (not shown).

The tail gate for the truck is shown as C and is pivoted at 6 to the bottom of the truck body. At each outer corner of the tail gate I provide eyes 7 to which quick release hooks or snaps 8 are secured. The snaps are secured on the ends of flexible members such as cables, chains or other suitable flexible means and such cables D are passed through wipers 11 at each upper outside edge of the side walls of the dump body and then passed over sheave wheels 9 and through downwardly slanting cable guide tubing 10 to sheave wheels 13. The cable after turning over the sheave wheel 13 is then turned inwardly under the dump body A passing over a guide roller 14 under the stringer 15 of the body to a sheave wheel 16. From this sheave 16 the cable is passed down around two spaced apart sheave wheels 17 and 18 and across the bottom of the truck to an identical set up of sheaves and back through a like formation of sheaves on the opposite side of the truck back to the initial starting point at the opposite corner of the tail gate. In other words, the construction of sheaves, cables etc. is identical on each side of the dump body. The sheaves 17 and 18 are spaced down from the dump body by hangers or suspended brackets 17a and cable guide or sheave guard members 19 are carried across the end of each sheave 17 and 18 and their like pair on the opposite side of the truck.

Onto the sides of the bed frame B and suspended therefrom I provide brackets which support a cross member 20 which member carries a pair of spaced apart sheave assemblies E and E1 hereinafter called telescoping yielding stands shown as 21 and 22 mounted vertically to the cross member 20. These assemblies consist of a base secured to the stand from which a vertical cylinder 23 is extended. This cylinder has an enlarged flat shoulder adjacent the base against which the spring rests. The cylinder carries a shaft 24 therein for the telescoping member and the shaft 24 is provided with an adjustable spring collar 25 step cut to fit the spring 26 which is carried on the shaft between the collar and shoulder and which spring normally holds the shaft and cylinder or telescoping assembly fully extended. A set screw 27 is provided on the collar for adjustment thereon to lock it onto the shaft 24 in any desired location. The outer end of the shaft 24 is formed in an offset bifurcated sheave housing 28 in which a modified sheave 29 is rotatably mounted on the sheave pin 30. This particular type of sheave is formed with spaced apart side walls 31 and 32 carried on a tapered drum 33 which drum is adapted to engage the cable D at any time when the dump body is lowered to the horizontal position.

The cylinder 23 is provided with longitudinal mill cuts or grooves 34 and the shaft 24 is provided with extended flanges to fit the mill cuts to prevent the shaft from being rotated in the cylinder thus keeping the sheaves 29 in proper position for engaging the cable D when the dump body is lowered.

When the body is lowered the cable D is engaged on each of the pairs of sheaves 29 on the cross member 20 and this causes the cable to be pulled inwardly thus drawing the tail gate closed. The sheaves 29 being mounted with yielding mounts provide for free yielding of the tail gate when in the closed position or at any point in the operation thereof.

The length of the cylinders 23 and shafts 24 regulate the amount of shortening of the cable.

When the cable is set in place on the body it is threaded over all of the sheave wheels and secured to the tail gate when in the open position so that there will be the proper amount of cable for full open position and likewise not too much cable so that the closing of the gate will be effected.

When it is desired to disconnect the cable from the tail gate, the snaps 8 are disengaged from the eyes 7 and are passed around the sheave wheels 36 mounted at the end of the bed frame and the snaps are then engaged with springs 37 mounted on the sides of the dump body so that the device may then be disconnected for some uses but be instantly ready for use again when desired.

The spring 37 takes up the shortening of the cable the same amount that is needed when the tail gate is raised by the assembly under the truck when in the operating position.

The positioning of the wheels 36 is such that the raising of the body will take care of the slack cable by the extending relationship between the wheels 36 and the dump body and the spring holds the cable tight at all times.

A cross brace 38 is provided between the two center assemblies E and E1 where needed to prevent the cable from drawing them inwardly causing them to break. It will be obvious that where the cable rises over these two assemblies E1 there will be sufficient clearance for drive shafts etc. in the center of the truck chassis.

Having thus described my invention, I desire to secure by Letters Patent and claim:

1. A control for dump truck body tail gates comprising, a flexible cable attached at each of the two upper corners of the tail gate and carried down the sides and under and across the bottom of the truck body in one continuous cable; sheave wheels to support and carry the cable around the truck body; and means mounted on the chassis frame to cause said cable to be overlapped when the body is lowered to the horizontal position thereby closing the tail gate.

2. A device as set out in claim 1 including, means suspended from the bottom of the dump truck body to support the cable spaced from the body.

3. A device as set out in claim 1 including, means to permit yielding of the cable when tension is placed on the tail gate during operation thereof.

4. A control for tail gates on dump trucks comprising, a dump truck body tiltably mounted on a truck frame; a tail gate for said body; a cable attached at its ends to the free corners of the tail gate, said cable being passed across under the body of the dump truck; spaced apart suspension brackets mounted under said dump body; spaced apart yieldable telescoping stands mounted on the truck frame with the stands staggered in relation to said brackets; sheave wheels mounted on the ends of the brackets and stands, said sheave wheels on the brackets adapted to carry the cable and said sheave wheels on said stands to engage the cable and overlap it causing the cable to shorten in relation to the dump body and thereby close the tail gate.

PHILIP R. FAIRBANKS.